United States Patent
Braun

[19]

[11] Patent Number: 6,059,337
[45] Date of Patent: May 9, 2000

[54] EZ GRINDER STORAGE UNIT

[76] Inventor: Jeffrey Scott Braun, 380 Shelly La., Elizabeth Town, Pa. 17022

[21] Appl. No.: 09/078,150

[22] Filed: May 13, 1998

[51] Int. Cl.<sup>7</sup> ........................................ B66C 1/56
[52] U.S. Cl. .............................. 294/158; 294/93
[58] Field of Search .................. 294/158, 159, 294/93, 165, 15, 98.1; 221/210

[56] References Cited

U.S. PATENT DOCUMENTS

| | | | |
|---|---|---|---|
| 1,848,717 | 3/1932 | Heline | 294/158 |
| 3,559,371 | 2/1971 | Borrowman | 294/87.12 |
| 3,649,036 | 3/1972 | Harz . | |
| 3,665,657 | 5/1972 | Lill . | |
| 4,036,424 | 7/1977 | Thany | 294/158 |
| 4,094,104 | 6/1978 | Zerfahs et al. . | |
| 4,548,537 | 10/1985 | Kubotera et al. | 414/276 |
| 4,684,128 | 8/1987 | Verstraeten | 273/448 |
| 4,730,419 | 3/1988 | Nagata et al. . | |
| 5,076,025 | 12/1991 | Reeble . | |
| 5,116,094 | 5/1992 | Jones | 294/93 |
| 5,207,030 | 5/1993 | Herrmann . | |
| 5,423,653 | 6/1995 | Harper | 294/158 |

*Primary Examiner*—Dean J. Kramer
*Assistant Examiner*—Paul T. Chin
*Attorney, Agent, or Firm*—Head, Johnson & Kachigian

[57] ABSTRACT

An apparatus for transporting and loading work pieces to be placed on a table grinder. The apparatus comprises a carrier unit and a plurality of holding tubes. Work pieces are placed over the tubes and are secured by means of a boot assembly located within the carrier assembly. The carrier unit comprises horizontal supports, vertical supports and a dial assembly. The dial assembly comprises a dial and a spring-loaded button. A cable is attached to the button and boot assembly. When the button is depressed, the boot assembly is relaxed thus allowing work pieces to be loaded or unloaded upon the tubes.

10 Claims, 5 Drawing Sheets

EZ GRINDER STORAGE UNIT

BACKGROUND OF THE INVENTION

The present invention relates to a device for transporting and loading work pieces upon a table grinder unit. More specifically, a portable apparatus which is able to hold a variety of work pieces upon a plurality of tubes until at such time as the work pieces are to be released and placed on a table grinder unit for grinding.

The grinding of spacers, washers, bearings and other mechanical parts is typically performed on a table grinding unit. It is often the case that these parts are loaded and unloaded onto the grinder by hand. This is a very time consuming and tedious process. Typically hundreds or thousands of pieces can be ground in a twelve hour period. The current method of hand loading and unloading work pieces is inefficient and can cause injury to the operator.

There is a need to more efficiently, effectively and safely load and unload work pieces. To date, no device is known which is able to deposit work pieces on a table grinding unit.

SUMMARY OF THE INVENTION

The principle objective of the present invention to provide a device which more efficiently and effectively and safely allows for the loading number of work pieces upon a table grinder unit.

Another objective of the present invention is to provide a device which allows for multiple work pieces to be transported from a machining area to a table grinding unit.

Another objective of the present invention is to provide a device which allows only a single work piece to be discharged at a time.

Another objective of the present invention is to provide a device which can be configured to interact with different types of table grinding units.

These objectives are obtained in accordance with the present invention in an apparatus comprising a carrier unit having a dial assembly and a plurality of holding tubes connected to the carrier unit. Each loading tube contains a boot assembly which in its resting position, prevents work pieces from passing over the end of the loading tube. Each boot assembly is connected to the dial assembly located in the carrier portion of the apparatus by means of a cable. The dial assembly has a spring-loaded button. When the button is depressed, the cable is pulled tight causing tension, thus, retracting the boot assembly from its resting position. A work piece is then able to be loaded upon or unloaded from the loading tube.

Due to the many variations of work pieces and table grinding units, the tubes can be of any size in which to fit a respected work piece or table or table grinding carrier. Furthermore, the boot assembly can be adjusted so that the distance from the boot assembly to the end of the loading tube is the thickness of the desired work piece. This allows the operator of the device to unload one work piece at a time. This allows more control over the unloading of work pieces upon a table grinder unit.

BRIEF DESCRIPTION OF THE DRAWINGS

FIG. 9A Top view of dial.

FIG. 10A Top view of button.

DETAILED DESCRIPTION OF THE PREFERRED EMBODIMENTS

Figure 2:
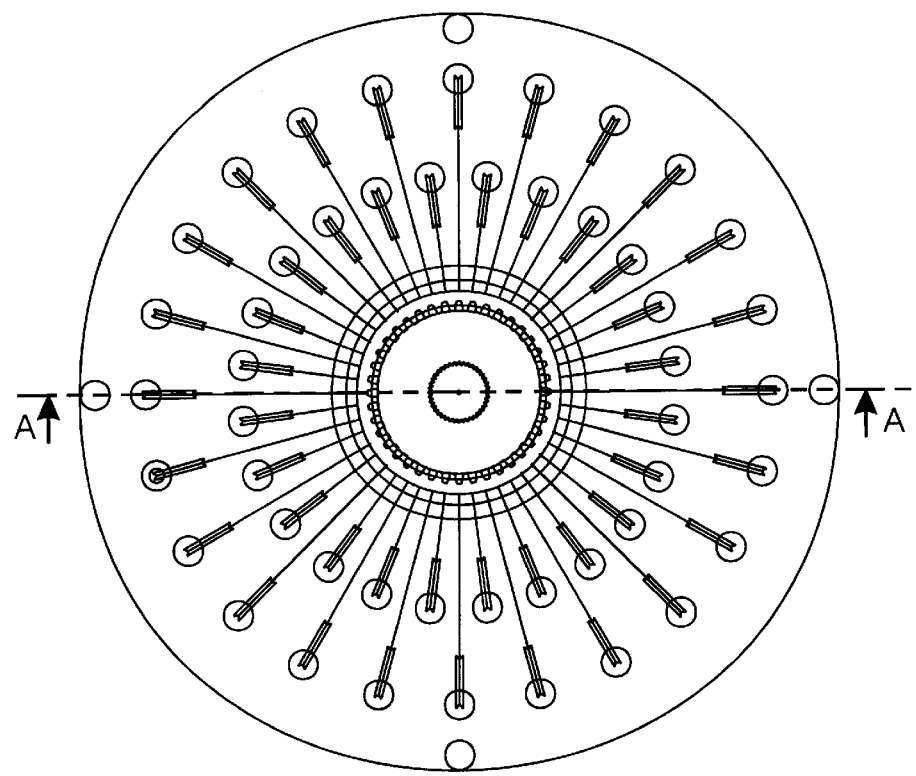
FIG. 2 Top view of the present invention along line AA.

Referring to FIGS. 1–11, the present invention relates to an apparatus 10 for holding table grinder work pieces 54 comprising carrier assembly 12, a plurality of tubes 38, a boot assembly 40 located within each tube 38 and a cable 36 in which to relax boot assembly 40 in order for the work pieces 54 to be placed over the tube 38. A grinder work piece 54 can be a spacer, washer, bearing and other mechanical part suitable for grinding. In general, work pieces 54 are loaded onto each tube 38 at a loading station not shown, then transported to table grinder unit not shown, wherein each work piece 54 is released individually onto the table grinder. Boot assembly 40 prevents the work pieces 54 from being released premature. Each boot assembly 40 is connected to a tube 38. Each tube 38 is connected to carrier assembly 12. Dial assembly 20, which is located within carrier assembly 12, is in contact with each boot assembly 40 by means of cable 36. Whenever dial assembly 20 is activated, boot assembly 40 is placed in a relaxed mode thus allowing work pieces 54 to be loaded upon or unloaded from each tube 38.

Figure 1:
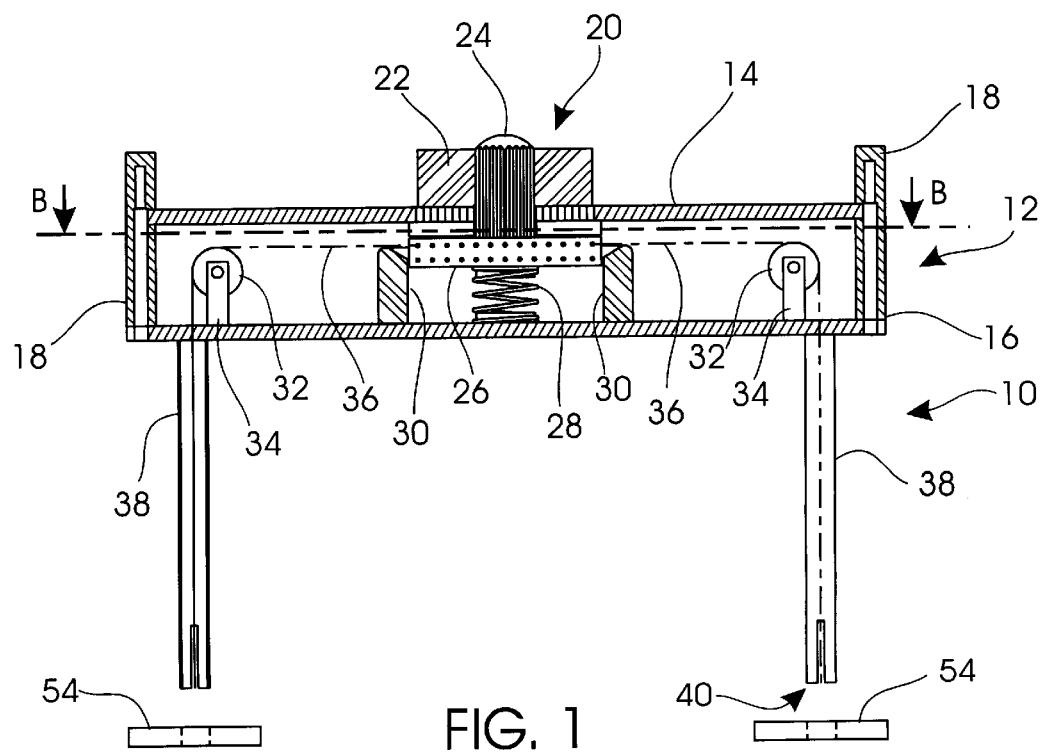
FIG. 1 Cross-sectional view of the present invention.
Figure 4:
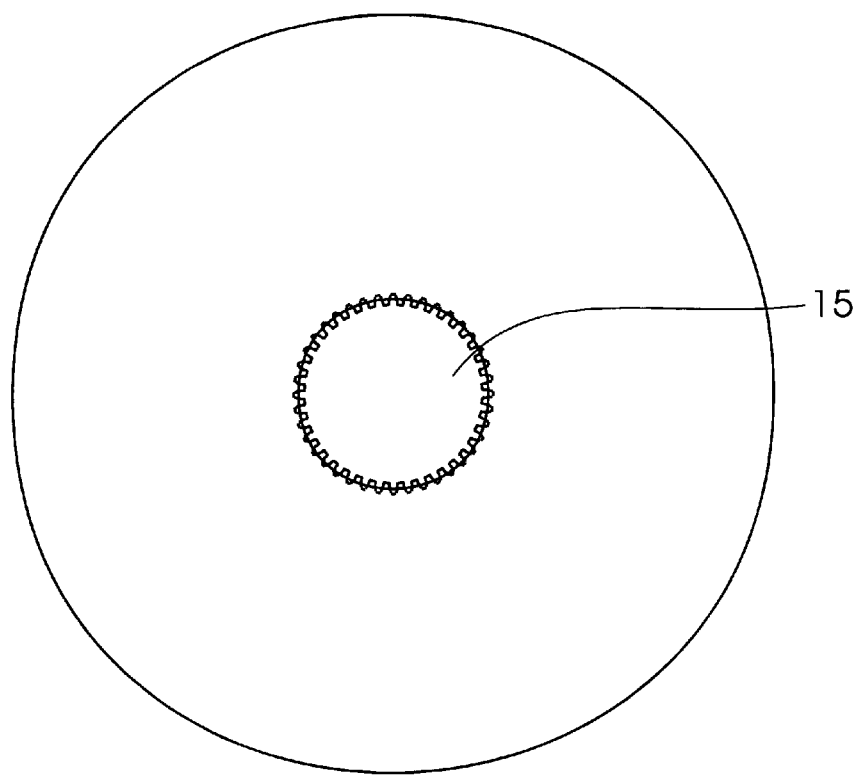
FIG. 4 Top view of the top plate of FIG. 1
Figure 3:
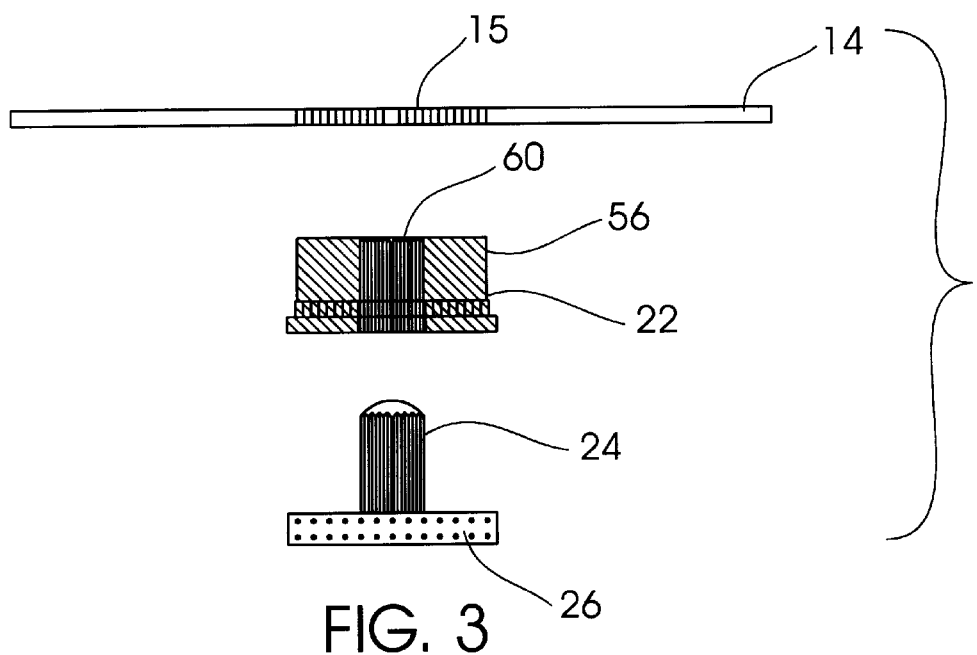
FIG. 3 Exploded perspective view of the dial assembly of FIG. 1.

Details of carrier assembly 12 are shown in FIGS. 1, 2 and 4, which show carrier assembly 12 having a top plate 14 having a grooved center hole 15, a lower plate 16, multiple vertical supports 18 and a dial assembly 20 which is in communication with lower plate 16.

Dial assembly 20, as shown in FIGS. 1–4, 9–10 shows a top plate 14, a dial 22 having an upper portion 56 and a lower portion 58 which has a grooved external surface; and a grooved internal hole 60. Dial 22 is located within the grooved center hole 15 of top plate 14 in such a manner that the grooved external surface of lower portion 22 meshes with the grooves of the grooved center hole 15. Dial assembly 20 also includes button 24 which has a lower securing plate 26. Button 24 has a grooved external surface which fits within the grooved internal hole 60 of dial 22. Dial assembly 20 is in contact with lower plate 16 by means of spring 28 and vertical guides 30, as shown in FIG. 2.

As shown in FIG. 1, tube 38 has a boot assembly 40 located at one end and is connected to lower plate 16 at the other end. Cable 36 is connected to boot assembly 40 at one end, and securing plate 26 at the other end. Cable 36 is supported by pulley 32 and pulley support 34.

Figure 5:
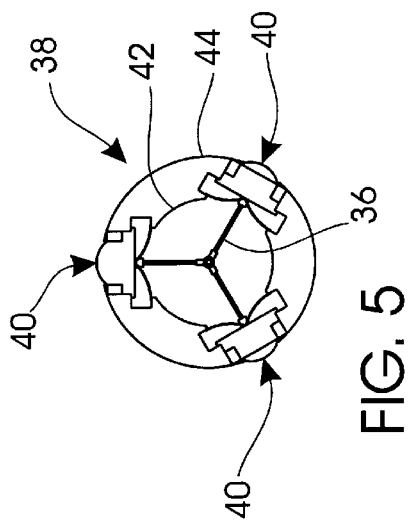
FIG. 5 Cross-sectional view of the boot assembly of FIG. 1.

Details of boot assembly 40 are shown in FIGS. 5–8. FIG. 5 shows boot assembly 40 located within the thickness of tube 38 wherein tube 38 having an interior wall 42 and an exterior wall 44. Boot assembly 40 has a plurality of boots 46 and a leaf springs 48. Each leaf spring 48 applies pressure upon each boot 46 causing the boot 46 to extend beyond exterior wall 44 thus preventing a work piece 54 from passing over. Cable 36 is attached to each leaf spring 48.

When button 24 is depressed, securing plate 26 is also depressed thus causing an upward tension upon cable 36 by means of pulley 32 thus pulling leaf spring 48 inward which in turn pulls boot 40 inward to such an extent that it no longer extends beyond exterior wall 44 thus allowing work piece 54 to pass along tube 38.

Figure 8:
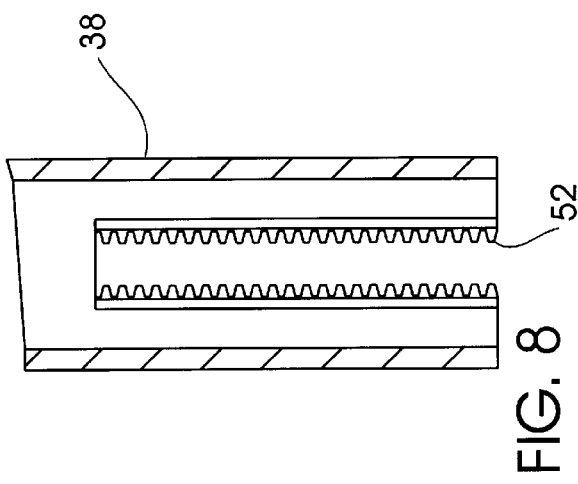
FIG. 8 Perspective view of the tube without the boot assembly.
Figure 7:
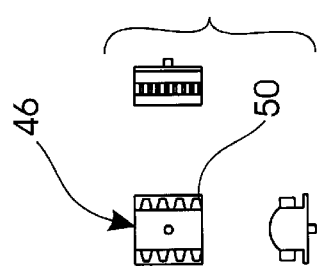
FIG. 7 Perspective view illustration of the boot of FIG. 6.
Figure 6:
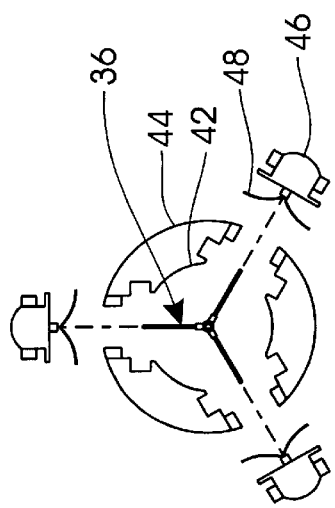
FIG. 6 Exploded top view of the boot assembly.
Figure 10A:
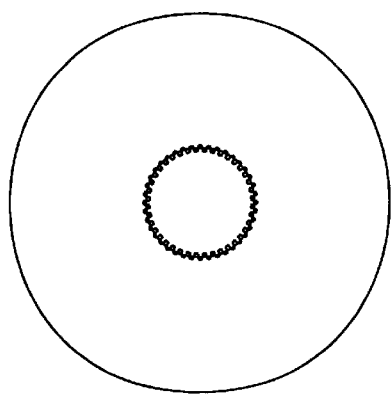
Figure 10B:
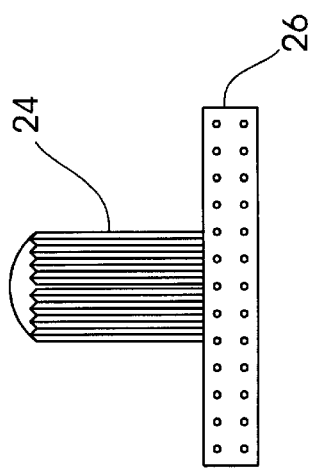
FIG. 10B Side view of button.
Figure 9A:
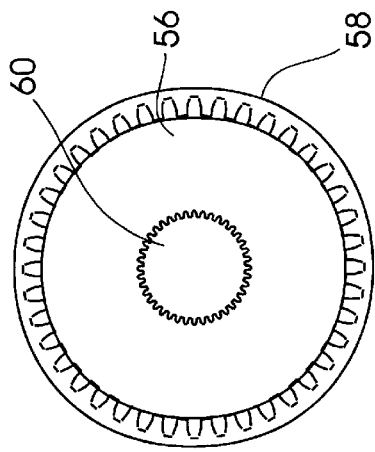
Figure 9B:
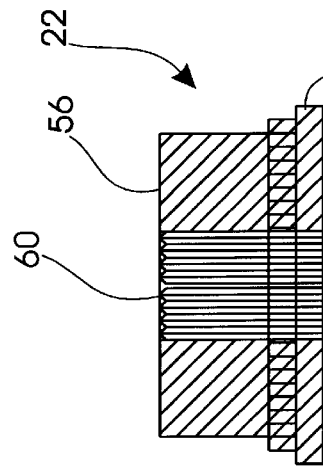
FIG. 9B Cross-sectional view of dial.
Figure 11:
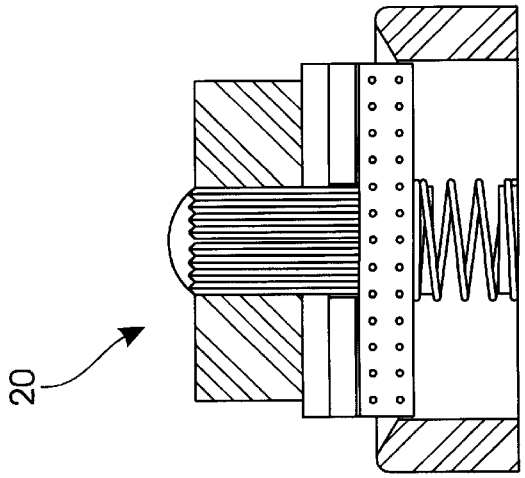
FIG. 11 Cross-sectional view of dial assembly.

FIGS. 7 and 8 show boot 46 with gears 50 and tube 38 with gear track 52. Boot 46 by means of gear 50 and gear track 52 can be placed in such a manner as to allow only one work piece 54 to be discharged at a time. This is accomplished by positioning boot 46 at a distance equal to the thickness of the work piece 54 from the end of tube 38.

Figure 13:
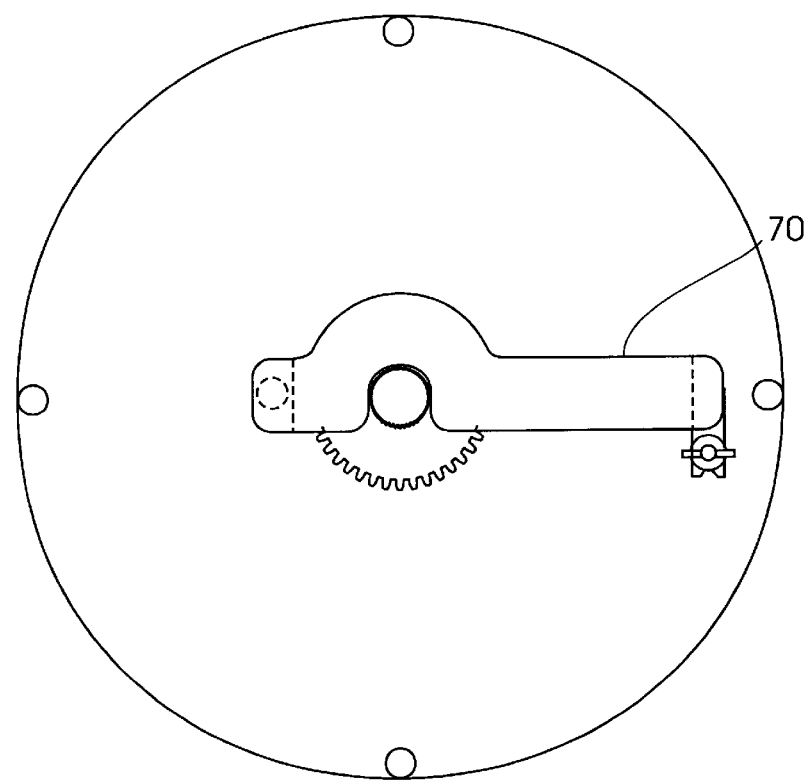
FIG. 13 Top view of present invention showing a handle
Figure 12:
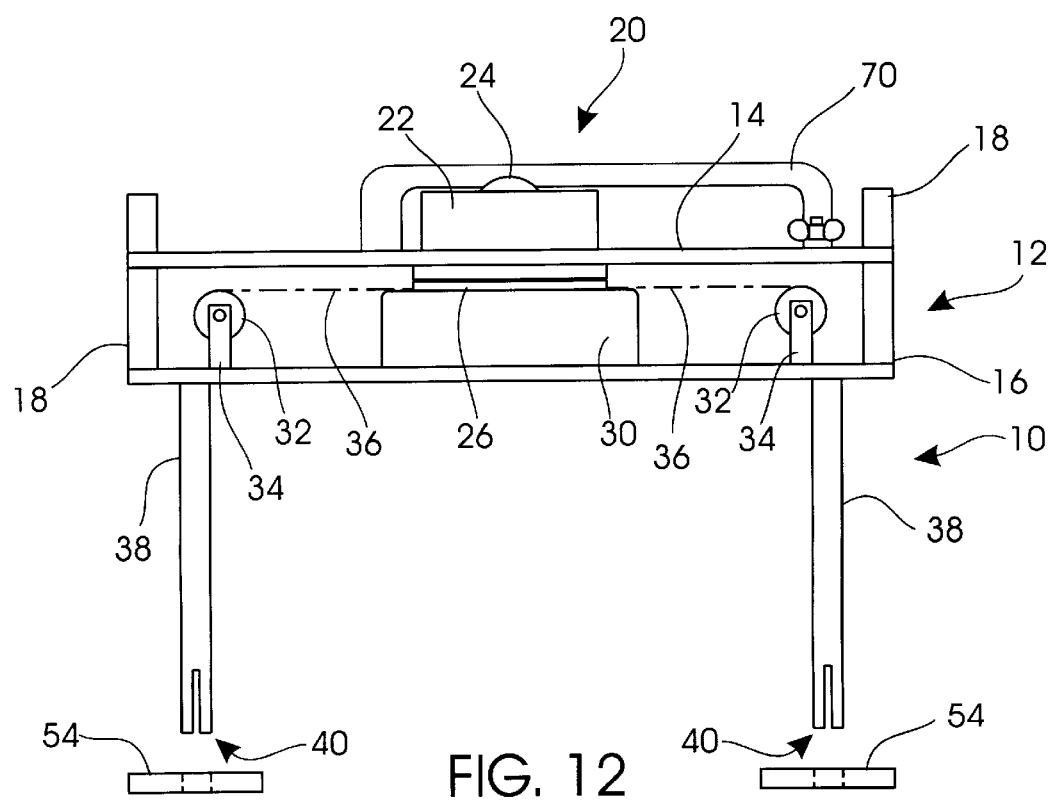
FIG. 12 Side view of present invention showing a handle

As shown in FIGS. 12 and 13, handle 70 can be attached to carrier assembly 12. Handle 70 is designed in a curved pattern in order to provide access to dial assembly 20.

Whereas, the present invention has been described in relation to the drawings attached hereto, it should be understood that other and further modifications, apart from those shown or suggested herein, may be made within the spirit and scope of this invention.

What is claimed is:

1. An apparatus for table grinder work pieces comprising:

a carrier assembly having an upper horizontal support, a lower horizontal support, a dial assembly connected to the upper horizontal support and the lower horizontal support, and a plurality of vertical supports connected to the upper horizontal support and the lower horizontal support a plurality of tubes to receive table grinder work pieces, with each tube having a first end, a second end, an interior and a wall having a thickness wherein the first end is connected to the carrier and the second end receives table grinder work pieces, a plurality of spring-loaded stops within the wall of each tube, and release means to relax the securing means so that a table grinder work piece may be loaded on to or unloaded from each tube comprising a wire having a third end and fourth end wherein the third end is connected to securing means and the fourth end is connected to the carrier.

2. The apparatus of claim 1 further comprising:

a handle removably connected to said carrier assembly.

3. An apparatus for table grinder work pieces comprising:

a carrier assembly having an upper horizontal support, a lower horizontal support, a dial assembly connected to the upper horizontal support and the lower horizontal support, and a plurality of vertical supports connected to the upper horizontal support and the lower horizontal support;

a plurality of tubes to receive table grinder work pieces, with each tube having a first end, a second end, an interior and a wall having a thickness wherein the first end is connected to the carrier and the second end receives table grinder work pieces, securing means within the wall of each tube, and release means to relax the securing means so that a table grinder work piece may be loaded on to or unloaded from each tube.

4. The apparatus of claim 3 wherein the release means comprises a wire having a third end and fourth end wherein the third end is connected to securing means and the fourth end is connected to the carrier.

5. The apparatus of claim 3 wherein the first end of each tube is connected to the lower horizontal support of the carrier.

6. The apparatus of claim 3 wherein the dial assembly comprises:

a dial with a spring-loaded button, and a lower plate connected to the dial.

7. The apparatus of claim 3 wherein the release means comprises a wire having a third end and fourth end wherein the third end is connected to securing means and the fourth end is connected to the dial assembly.

8. The apparatus of claim 7 wherein the fourth end is connected to the dial assembly.

9. The apparatus of claim 7 wherein the dial assembly comprises:

a dial with a spring-loaded button and a lower plate connected to the dial.

10. The apparatus of claim 3 further comprising:

a handle removably connected to said carrier assembly.

* * * * *